(12) United States Patent
Edwards et al.

(10) Patent No.: US 6,834,312 B2
(45) Date of Patent: Dec. 21, 2004

(54) METHOD AND APPARATUS FOR DELIVERY OF DATA OVER A NETWORK

(75) Inventors: Robert David Edwards, Woodbridge, CT (US); John Stephen Wallack, Ridgewood, NJ (US); Thomas G. Peterson, Wallingford, CT (US)

(73) Assignee: CADopener.com 11c, Prospect, CT (US)

( * ) Notice: Subject to any disclaimer, the term of this patent is extended or adjusted under 35 U.S.C. 154(b) by 629 days.

(21) Appl. No.: 09/671,350

(22) Filed: Sep. 27, 2000

(65) Prior Publication Data

US 2002/0069295 A1 Jun. 6, 2002

Related U.S. Application Data

(60) Provisional application No. 60/201,266, filed on May 2, 2000.

(51) Int. Cl.[7] .............................................. G06F 17/30
(52) U.S. Cl. ........................ 709/246; 709/231; 709/236; 709/247
(58) Field of Search ................................ 709/200–206, 709/217–219, 213, 227–230, 246; 345/420

(56) References Cited

U.S. PATENT DOCUMENTS

| 4,951,196 A | 8/1990 | Jackson ...................... 364/401 |
| 5,117,354 A | 5/1992 | Long et al. .................. 364/401 |
| 5,146,404 A | 9/1992 | Calloway et al. ........... 364/401 |
| 5,202,977 A | 4/1993 | Pasetes, Jr. et al. ......... 395/500 |
| 5,283,887 A | 2/1994 | Zachery ...................... 395/500 |
| 5,557,780 A | 9/1996 | Edwards et al. ............ 395/500 |
| 5,608,874 A * | 3/1997 | Ogawa et al. |
| 5,619,700 A | 4/1997 | Abe |
| 5,627,972 A | 5/1997 | Shear .................... 395/200.18 |
| 5,634,064 A | 5/1997 | Warnock et al. ............ 395/774 |
| 5,758,126 A | 5/1998 | Daniels et al. .............. 395/500 |
| 5,758,327 A | 5/1998 | Gardner et al. ............... 705/26 |
| 5,765,137 A | 6/1998 | Lee ............................... 705/7 |
| 5,790,793 A | 8/1998 | Higley ................... 395/200.48 |
| 5,794,234 A | 8/1998 | Church et al. ................. 707/4 |
| 5,819,301 A | 10/1998 | Rowe et al. ................ 707/513 |
| 5,832,530 A | 11/1998 | Paknad et al. .............. 707/500 |
| 5,870,719 A | 2/1999 | Maritzen et al. ............. 705/26 |
| 5,926,817 A | 7/1999 | Christeson et al. .......... 707/10 |
| 5,995,939 A | 11/1999 | Berman et al. ................ 705/3 |
| 6,006,199 A | 12/1999 | Berlin et al. ................. 705/26 |
| 6,023,700 A | 2/2000 | Owens et al. ................ 707/10 |
| 6,023,714 A | 2/2000 | Hill et al. ..................... 707/13 |
| 6,043,815 A | 3/2000 | Simonoff et al. ........... 345/335 |
| 6,336,124 B1 * | 1/2002 | Alam et al. ................. 715/523 |
| 6,336,216 B1 * | 1/2002 | Curtis et al. ................ 717/174 |
| 6,614,430 B1 * | 9/2003 | Rappoport .................. 345/420 |

OTHER PUBLICATIONS

*Solid View 3.0 Brochure*, C2C Technologies, Inc., Oct. 6–8, 1998.

Adobe Store: Create Adobe®PDF Online; http://www.adobe.com/stor/products/createpdf html; Apr. 17, 2000; p. 1.

Adobe Store: Create Adobe®PDF Online—Frequently Asked Questions; hhtp://cpdf.adobe.com/cgi–feeder.pl/faq; Apr. 17, 2000; p. 1–2.

(List continued on next page.)

*Primary Examiner*—Frantz B. Jean
*Assistant Examiner*—John R Brancolini
(74) *Attorney, Agent, or Firm*—Morgan, Lewis & Bockius, LLP

(57) ABSTRACT

A data delivery system for communicating sophisticated information between a first and second computer over a network, such as the Internet. The delivery system resides on a network server and will receive information stored in a source file, translate the data, and deliver the data package that allows a recipient to use the sophisticated information without requiring the recipient to use software compatible with the source file.

3 Claims, 2 Drawing Sheets

OTHER PUBLICATIONS

Adobe Store: Create Adobe®PDF Online—General Settings Help; http://cpdf.adobe.com/cgi-feeder.pl/help_general; Apr. 17, 2000; p. 1–2.

Adobe Store: Create Adobe®PDF Online; http://cpdf,adobe.com/cgi-feeder.pl/formats; Apr. 17, 2000; p. 1–2.

File Formats Supported by Create Adobe®PDF Online Service—Support Database; http://cpdf.adobe.com/support/salesdocs/f71e.htm; Apr. 17, 2000; p. 1.

UPS Document Exchange—Idea Exchange; http://exchange.ups.com/@Λ@1$C5g$3C$4Go~...000000000007059036/docs/ideaexchange.html; Feb. 4, 2000; pp. 1–2. Attachment: UPS Online Courier Services Agreement, Feb. 4, 2000; pp. 1–8.

UPS Document Exchange—FAQ's; http://exchange.ups.com/@Λ@1$C5g$3C$C4Go~...9$0F00000000000000-07059036/docs/faq.html; Feb. 4, 2000; pp. 1–6.

Adobe Document Server; http://www.adobe.com/products/docserver/main.html; Apr. 20, 2000; pp. 1–2. Attachment: Adobe Acrobat 4.0; ©1999 Adobe Systems Incorporated; BC1338; 7/99; pp. 1–4.

Ariba ORMS; Ariba ORMS Overview; http://www.ariba.com/corp/AribaSolutions/ariba_orms.asp; Attachment: whatwedo.asp.

* cited by examiner

FIG. 2

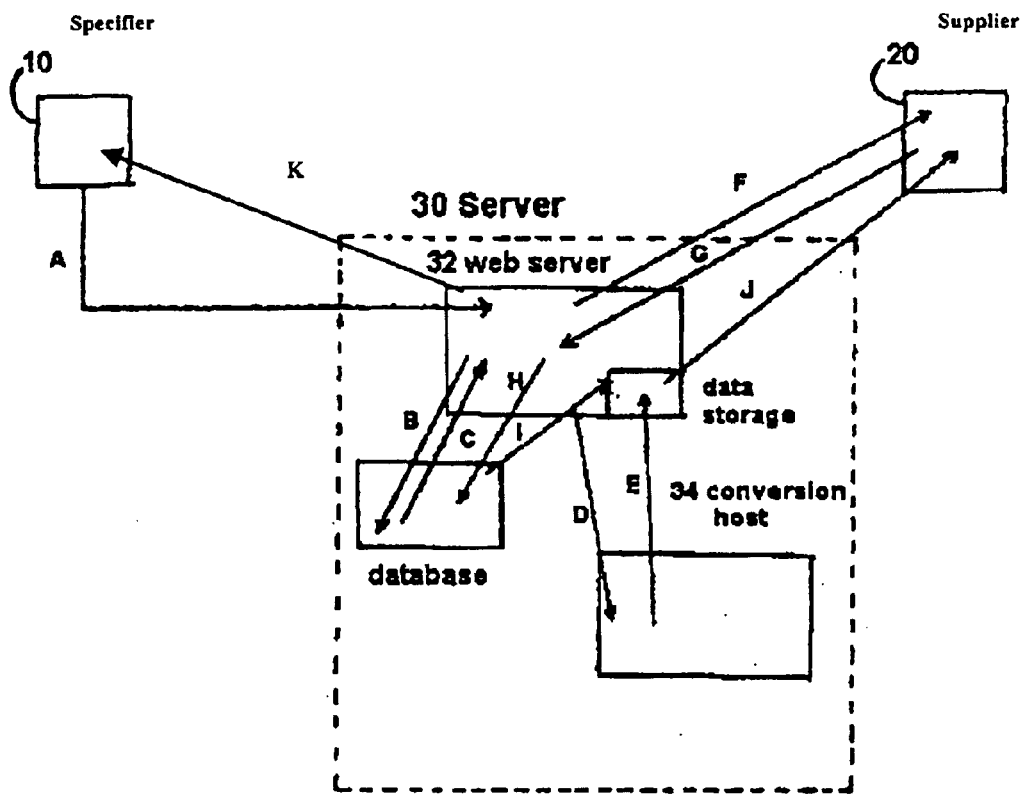

| Steps (Fig. 2) | Examples of steps for Communicating Information Between a Specifier and Supplier via a Network Server 30 (Preferred Embodiment) |
|---|---|
| A | Specifier contacts web site (Server), engages in a secure 2-way communication, enters information identifying Specifier as an authorized client of Server and uploads source file(s). |
| B | web server communicates the Specifier's conversion order to the database. |
| C | database acknowledges a recognized conversion order to web server. |
| D | web server transfers source file(s) to conversion host. |
| E | conversion host converts source file(s), prepares email(s) and stores output file(s) in data storage. |
| F | web server sends email(s) to Supplier(s). |
| G | If accepted, Supplier contacts web site (Server), engages in 2-way secure communication, enters information identifying Specifier as an authorized client of Server and requests output file(s). |
| H | web server contacts database for file locations and conversion order. |
| I | database tells web server the file location in data storage for download by Supplier |
| J | Supplier downloads output file(s) from data storage. |
| K | web server sends email(s) to Specifier |

METHOD AND APPARATUS FOR DELIVERY OF DATA OVER A NETWORK

This application claims priority of copending provisional application(s) No. 60/201,266 filed on May 2, 2000.

BACKGROUND OF INVENTION

1. Field of Invention

The invention relates to a method and apparatus for communicating information over a network and more particularly, to a method and apparatus for communicating information generated by a software application from one computer to another computer over a network.

2. Discussion of the Related Art

With the growth in computer based activities, there has been a concomitant growth in the sophistication and diversity of application software offering solutions to virtually all business and personal needs. Within a given application environment, a software user may select, depending on his/her needs or preferences, from among a large number of competing software products offering similar or differing levels of sophistication from the relatively simplistic and low cost application offering limited functionality to high-end software systems offering a wide range of functionality accompanied by high costs and user expertise in operating the software. One notable feature of commercial application software is the lack of data compatibility between competing application software or the need for obtaining additional software in order to use data communicated from application software residing on other computers. Incompatibility between application software prevents users from readily communicating data. Compatibility problems also exist between subsequent versions of the same application software (i.e., software is usually forward compatible but rarely backwards compatible). The cause for this incompatibility between application software is believed to be rooted in the need to provide incentives for users to continuously update their software, to purchase the same brand of software or the desire to not disclose proprietary file formats to competitors. Thus, from the perspective of the software manufacturer, there is simply no desire to provide complete compatibility with competing software. At best, only a portion of the data can be imported seamlessly into other software applications. Although application software will sometimes provide a user with a standard data type for importing or exporting data to competing application software (or earlier software versions), the export/import procedure is burdensome on the user, especially where the user only has a limited use for the data, the data is frequently being updated or the user is pressured by the demands of extracting or using the data a timely manner. Moreover, this imported/exported data is usually functionally limited or incomplete. The result is that the data cannot be communicated in an effective manner between users unless each user purchases the same application software as well as the same version of the software application. This drawback in today's application software creates a significant barrier to the flow of digital information.

The above limitations in application software have become more evident in recent years with the increased demand for communicating information over computer networks and in particular, the increased demand for communicating data that is far more complex than, for example, electronic mail messages or the standard data formats supported by network browsers. In today's business environment, computer networks (e.g., the Internet) offer significant advantages in speed, convenience, cost savings, and drastically expanded communication networks for delivering information. However, the potential for delivering information over computer networks will not be fully realized so long as there remains the central problem of data compatibility between software applications. A network exchange of data that requires each user to share the same proprietary software, or purchase additional software, may be advantageous to the software manufacturer, but it serves only to frustrate those who wish to take advantage of communicating over computer networks.

One example of where application software incompatibility between sender and recipient has presented significant obstacles to network communications is in the context of communicating information contained in Computer Aided Design (CAD) or Computer Aided Manufacturing (CAM) files to/from the designer/engineer to other designers/engineers or manufacturing suppliers utilizing different computers/software.

In the later case, for example, a designer may wish to solicit, from a pool of suppliers, a quote for manufacturing a part described in the designer's CAD/CAM file. Without the compatible CAD/CAM software, a prospective supplier cannot inspect the design requirements. Moreover, since the supplier only has a limited use for the data (e.g., to review the shape, dimensions, material requirements and annotations) and only needs to view the data for the purposes of providing a quote to the designer, the supplier has no desire for investing the thousands of dollars necessary for purchasing and/or upgrading a plurality of CAD/CAM software applications containing superfluous software functionality (e.g., design capabilities) in order to respond to a request.

The above example highlights similar obstacles facing businesses that require exchanges of data across different disciplines. The demand is "give me access" to your information, whether it be from manufacturing, marketing & communications, publications, sales, or QA personnel, to name a few. The information is needed in a timely manner without the need for procuring specialized application software. Having to negotiate through software compatibility or procurement problems does little to optimize business operations, especially in the face of ever shrinking lead times, product life cycles, budgets and cost targets. These concerns are magnified with the requirement for higher quality for increasingly more complex and sophisticated products. Moreover, the obstacles presented by software incompatibility are not just limited to the frequent business contacts or between intra-business personnel. The trend towards creating a global network of business contacts for outsourcing jobs (e.g., as in the CAD/CAM example above), responding to business requests for proposals, or simply providing business products has created a present and growing need for delivering complex information to virtually anywhere in the world without operating under the restraint of software compatibility.

One approach to communicating information over networks is provided by the well known Adobe Acrobat Reader™ (Adobe). This software may be downloaded for free over the Internet and allows a user with a basic networked computer platform (e.g., storage medium, operating system, Internet connection and browser software) to view text or graphical data that has been converted to a Portable Document Format (PDF). Although Adobe™ provides the user with the ability to view and print textual or graphical images of almost any level of sophistication received over the Internet, the sender of information must still purchase or otherwise procure the software for storing the data in a PDF file format, convert the data into a PDF and then transmit this converted data to the recipient, then the recipient of the converted data will need to separately procure and load the viewer software. Additionally, Adobe™ is limited to data which are essentially printable documents stored in an electronic form. Adobe™ does not provide the sender/recipient with a medium of exchange for communicating electronic models or other types of complex data that require the user to interrogate the data to select a desired view or access a particular portion of the data which is not stored in a document-type format.

As a result of the foregoing drawbacks and limitations in application software compatibility and the delivery of information in a timely and efficient manner to meet the needs for communicating information over networks, there exists a need for providing a data delivery system adapted for transmitting information over a network in a secure, reliable and efficient manner and which does not require the sender of such information to be concerned with whether the recipient's computer provides the software support for using the data. In particular, the existing network delivery systems and application software do not address the need for communicating sophisticated information over a network without the separate procurement of software or multiple software packages and without requiring sender/recipient to engage in intermediate data conversion procedures (e.g., data import/export, translation, compression, encryption).

SUMMARY OF INVENTION

The invention satisfies these needs while avoiding the disadvantages of the prior art by providing a network delivery of electronic data for communicating information from a sender to an intended recipient without requiring the sender or recipient to separately procure software for enabling the viewing, reading, interrogating, etc., of the data delivered over the network. The delivery system allows senders to communicate information stored in a source file without being limited to only those recipients who have access to the software that provides the recipient with the ability to view, read, interrogate, extract, etc., or otherwise to have access to the information contained in the source file.

In one aspect of the invention, there is provided a method for providing over a network information stored on a first computer to a second computer based on source data from a software application wherein the source data requires a compatible software application resident on the second computer. The method includes the steps of receiving the source data on the first computer, translating the source data and packaging the translated data for access by the second computer over the network wherein the packaged data does not require application software resident on the second computer in order to use the data. The method may also include the steps of protecting the translated data so as to ensure restricted access to the translated data over the network and/or to limit a recipient's access to the translated data, storing the translated data with a data accessing portion in a self-extracting file and providing a plurality of deliverable data types depending on recipient needs and/or requirements of the sender.

In still another aspect of the invention, there is provided a method for communicating to a plurality of receiving computers a request for response from a solicitor over a network. In this aspect of the invention, there is provided the steps of receiving from the solicitor a registry of network addresses, receiving solicitor source data from any of a plurality of software applications, translating the solicitor source data into a translated data format, notifying the plurality of computers of the request for response based on the registry of network addresses and if the request for response is accepted, providing access to the translated solicitor data. In this aspect of the invention, the method may further include providing sophisticated information pertinent to the solicitation, e.g., a request for quote from a solicitor requiring communication of a 3D model, to all recipients, regardless of whether each recipient shares the same software or software version of the application software that stored the sophisticated information.

The advantages of the invention further include a data structure for delivery to a computer over a network (e.g., the Internet), the data structure communicating sophisticated information generated from source data from a computer wherein the source data requires a software application for access to the source data. The data structure includes a translated data portion storing the information generated from the source data and a data accessing portion for accessing the translated data, wherein the translated data and the data accessing portion enable the computer to communicate the sophisticated information stored in the source data without requiring the use of application software. In this aspect of the invention, the data structure may contain information generated from any of a plurality of application software and may also be packaged in one of a plurality of secured delivery file formats. The translated data and data accessing portions may also be delivered separately or packaged together in a self extracting file.

Additional features and advantages of the invention will be set forth or be apparent from the description that follows. The features and advantages of the invention will be realized and attained by the functions and methods particularly pointed out in the written description as well as the appended drawings.

It is to be understood that both the foregoing general description and the following detailed description are exemplary and explanatory and are intended to provide further explanation without limiting the scope of the invention.

DETAILED DESCRIPTION OF THE DRAWINGS

The accompanying drawings, which are included to provide a further understanding of the invention, are incorporated in and constitute a part of this specification, illustrate preferred embodiments of the invention and together with the description serve to explain the principles of invention. In the drawings:

FIG. 2 is a preferred implementation of the server of FIG. 1.

DETAILED DESCRIPTION OF THE PREFERRED EMBODIMENTS

Figure 1:
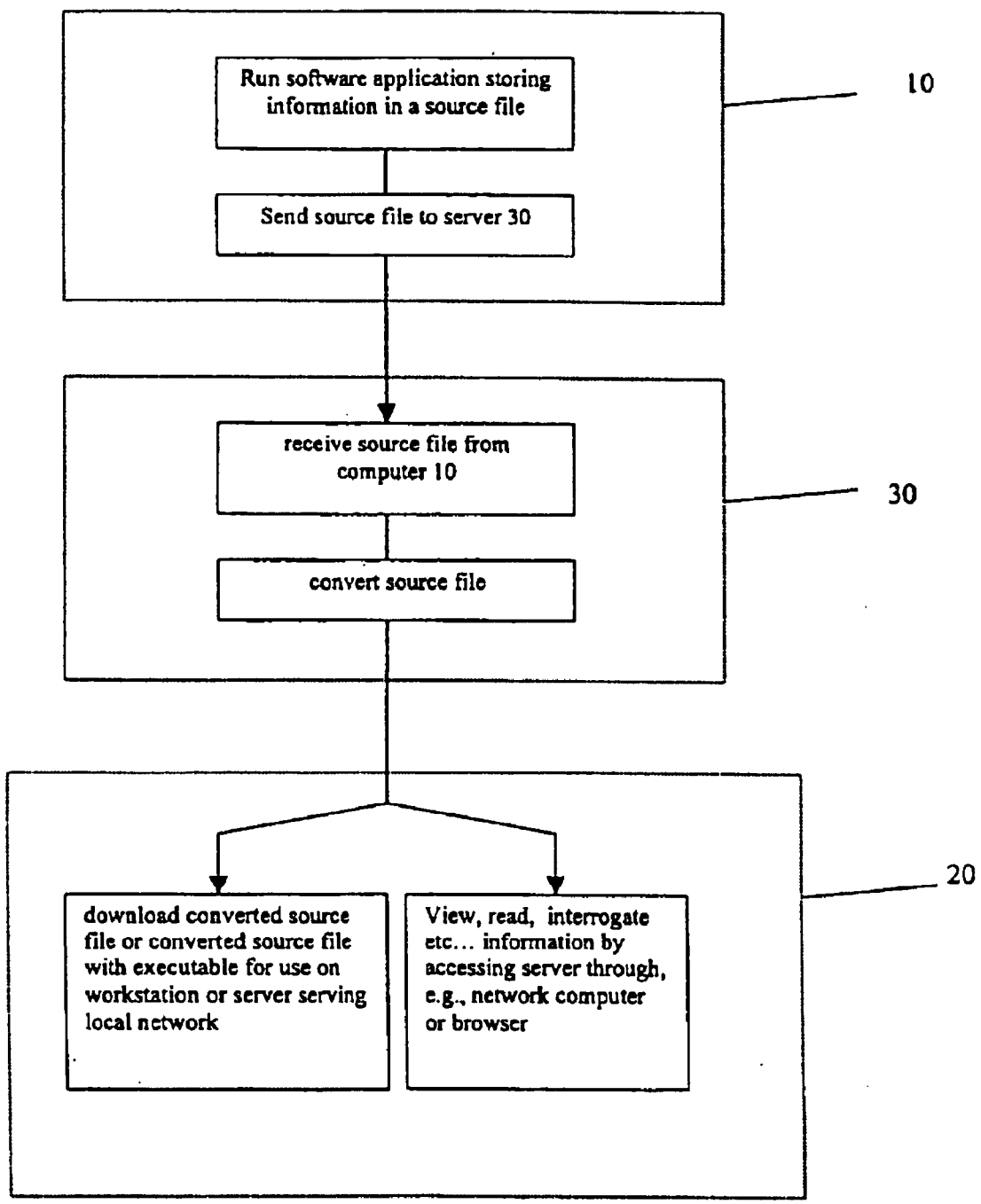
FIG. 1 is a schematic illustration of a first embodiment of invention.

Reference will now be made in detail to the preferred embodiments of the invention, examples of which are illustrated in the accompanying drawings.

Referring to FIG. 1, there is illustrated a schematic embodiment of a delivery system for communicating information between a first client computer 10 and a second client computer 20. The delivery system allows a computer 10 to communicate information stored in a source file to computer 20 without requiring a user of computer 20 (the recipient) to have access to a software application compatible with the source file in order to read, view, interrogate, etc.

(hereinafter use) the information. Thus, in the case of where computer 20 does not have the software that allows the recipient to view the data in the source file format, the delivery system will provide the software that enables the recipient to use the data. The delivery system provides a network-based medium that may be used to communicate standard forms of data, such as text documents, 2D raster graphics or a combination thereof, and may also be used to communicate sophisticated information, such as the data types associated with a mathematical model of physical data.

First computer 10 and second computer 20 are connected to each other through a network (e.g., the Internet) that allows computer 10 and computer 20 to communicate files, email, etc., between each other and a network server generally represented by server computer 30. First computer 10 and second computer 20 each include the standard input and output devices, hardware and software (e.g., a hard disc, monitor, random access memory and operating system) found on personal computers and further include standard hardware and software devices for communicating over a network. Alternatively, first computer 10 or second computer 20 may refer to a server computer associated with a Local Area Network (LAN) or intranet serving other workstations. Additionally, computer 20 may refer to a network computer, thin client, a computer that can access data stored on the server using a network browser with a Java Interpreter (e.g., a Java Virtual Machine) or other devices that can utilize Applets, or other network server interfaces well known to those skilled in the art.

First computer 10 includes a software application that writes the data to a source file characterized by a file format associated with the application software. The user (sender) residing on computer 10 wishes to communicate the information stored in the source file to a recipient residing on computer 20 over the network. The data delivery is accomplished as follows. The source file is delivered to server 30, which will receive the source file and in turn provide an output file that may be accessed directly at server 30 (e.g., as in the case of where computer 20 is a network computer or computer that accesses data using a network browser) or downloaded by computer 20 for local use (e.g., as in the case of where computer 20 is a workstation, personal computer or network server serving local clients). In either case, server 30 may be adapted for receiving and converting source files originating from any of a plurality of software applications so as to provide a seamless communication medium between computer 10 and computer 20, regardless of the sender's preferred application software type.

If the output file is to be downloaded by computer 20, server 30 may provide the output file by itself, or the server may provide the output file and executable file wrapped in a self-extracting file for delivery to computer 20. When only the output file is downloaded, server 30 provides for delivery options depending on the specific needs of the recipient as in, for example, when the recipient has previously received the executable file from server 30 or the recipient has received a copy of the executable file through other sources. In any event, with the output file and executable resident on computer 20, only the operating system software of computer 20 is needed to access the data. Examples of typical operating systems are Microsoft™ Windows 95™, Windows 98™, Windows NT™ and Windows 2000™. Thus, the delivery system of the present invention provides access to information stored in a source file without requiring software compatibility between computer 10 and computer 20 since the computer 20 software need not be capable of reading the source file generated by the software application on computer 10.

A preferred embodiment of the server represented generally by server 30 in FIG. 1 will now be described in detail by reference to FIG. 2. In this embodiment, server 30 receives the source file from computer 10 (sender) and provides, or makes available the data package (i.e., output file by itself, or output file wrapped in a self-extracting file with an executable file) to computer 20 (recipient) over the Internet. This embodiment of the delivery system is adapted for receiving, processing and delivering data from one or more users to any number of recipients. Referring to FIG. 2, server 30 includes a web server 32 and a conversion host 34. Web server 32 and conversion host 34 may or may not reside on the same network segment, depending on particular needs. For example, if it is necessary to achieve a high degree of robustness and performance of server 30, then both web server 32 and conversion host 34 can be located on the same network segment since this may result in improved efficiency and reliability of data transfer between web server 32 and conversion host 34. Moreover, web server 32 and conversion host 34 need not reside on separate computers, as will be readily apparent to those skilled in the art.

Web server 32 provides the front end functionality for allowing the sender to upload a source file, network address of the intended recipient, and any additional information intended for the recipient of the data package. For example, the sender may wish to deliver a text message summarizing the information contained in the source file. Such functionality of web server 32 is well known to those skilled in the art. After the source file is received from the sender, web server 32 will store the source file in a way that is accessible to conversion host 34. Web server 32 provides a storage medium for storing the source file and additional information uploaded by the sender for processing by conversion host 34. A database server organizes client directories, which are associated with a separate registry of client information (e.g., client names or account numbers, network addresses, a list of designated recipients). With this format, web server 32 and conversion host 34 are adapted for receiving and maintaining data received from one or more senders.

Conversion host 34 controls most of the data processing steps, including data conversion, file storage, and the preparation of messages for delivery to the recipient and sender. Web server 32 provides for secure source file upload, secure output file download, and the sending of pre-constructed email communications. Conversion host 34 and web server 32 are configured for automatically processing a source file for an intended recipient upon receiving the source file from a registered client. One embodiment of the procedure is as follows. The conversion host 34 will perform periodic queries of web server 32 to detect recently received source files. If a new or unprocessed source file is detected, the source file is transferred to conversion host 34. The conversion software resident on conversion host 34 will then initiate the conversion of the data into a data package for delivery to the recipient. In addition, conversion host 34 will construct an email(s) for delivery to the recipient(s), notifying them that the data package is available and including an address of the server site, address of the sender, and pertinent to the data offered by the sender. The data package is transferred to data storage for later retrieval by the intended recipient(s) and the email(s) is/are then uploaded to web server 32 for delivery to the recipient(s) over the Internet. The delivery of messages associated with the information uploaded from the sender are preferably communicated via email(s) delivered to the sender and recipient (s) over the network. The messages may alternatively be delivered using other telecommunication mediums, e.g., a facsimile message, pager, etc.

In the preferred embodiment of server 30, a Windows NT 4.0™ workstation is configured for use as conversion host 34 and a Unix-based server with an SQL database is configured for use as web server 32. However, it is to be noted that any of the widely available computer workstations with network communication software and hardware may be configured for use as web server 32 and/or conversion host 34. Thus, a particular choice of network configurations, software and hardware is not required, nor considered essential in practicing the invention, but can be selected depending on individual needs. It is therefore expected that one skilled in the art can readily configure a network server platform to provide, based on the description of the various aspects of invention described herein, the various functionality and data output that is considered within the scope of the invention since the invention can be practiced using a wide variety of available network server architectures.

The aforementioned embodiment of server 30 is preferably implemented in a network delivery service for communicating Requests For Quotes (RFQs) from a designer/engineer/prime contractor/buyer (hereinafter specifier) located at computer 10 to a pool of manufacturing suppliers/subcontractors/sellers/engineers (hereinafter supplier) located at computer 20 connected to server 30 over the Internet. This implementation of the invention provides a specifier with a convenient, readily accessible and automated means for communicating secure, time sensitive manufacturing requests by delivering information found in Computer Aided Design (CAD) or Computer Aided Manufacturing (CAM) files without concern for whether the intended suppliers have access to the compatible CAD/CAM software (sometimes, suppliers will not even own CAD/CAM software) and without encountering difficulties in transferring the data or risking unauthorized access to the data (as described in greater detail below) over the Internet.

The preferred conversion software calls a separate, subordinate software application to perform the conversion of source data. In this preferred implementation of the invention, the conversation software makes use of SolidView/Pro, a software application available through Solid Concepts™, Inc. (http://www.solidview.com) to convert a CAD/CAM source file into an output file. The preferred executable file provided for delivery to the supplier is SolidView/Lite, also available through Solid Concepts™, Inc. (http://www.solidview.com). Although it is preferred to use the above conversion software configuration and executable, the invention is not limited to this type of configuration or any particular software used since it is understood that those skilled in the art are capable of providing software with all of the aforementioned functionality without departing from the scope of the invention.

During the conversion process, the model build data (e.g., a model construction history tree) is removed from the CAD file resulting in a reduced file size deliverable. The removal of model build data is not a necessary function of the conversion software nor essential to practicing the invention, however, there are advantages to using a conversion software with this type of functionality, one of which is reducing the file size of the deliverable. The model build data is not needed for an RFQ since the supplier typically does not intend to change the physical properties of the model, nor does the specifier typically wish to allow the supplier to alter the data. The conversion software may also be configured to extract and convert, as determined by specifier preference, only a portion of the source data in the output file. Alternatively, the conversion software may format the output file so as to provide varying levels of user access to the data by providing the specifier with the option of selecting among a plurality of user viewing rights when uploading the source file. For example, the specifier may select one of multiple password access rights (from most restricted to full access to the source file). In regards to these specifier delivery requirements, by providing a non-modifiable output file to the supplier and/or offering the specifier the option of only providing to the supplier a portion of the information stored in the uploaded source file (e.g., restricted viewing rights to the output file, providing only a collection of 2D images or a summary of dimensions and material requirements for a part), the delivery system provides the specifier with all of the aforementioned advantages of a network delivery system without compromising the special need for protecting sensitive, proprietary and/or competitive business information.

Web server 32 and conversion host 34 will preferably provide either the output file by itself or the output file wrapped in a self extracting file with the executable file. In addition, web server 32 and conversion host 34 may also provide, depending on specifier requirements, a copy of the original source file uploaded by the specifier. This download feature of the preferred embodiment is desirable for the cases where, for example, a supplier has agreed to manufacture a part and will need access to the specifier's CAD source file data for programming the tooling instructions for manufacture of the part.

An encryption standard is used to protect the output file from unauthorized interception over the network. In the preferred embodiment, web server 32 will encrypt the output file by using a Secure Socket Layer (SSL) with dual key encryption since a high degree of security is desired by some clients. Other encryption standards or authentication methods may also be used, depending on particular needs. These encryption and authentication methods are known to those skilled in the art and are within the scope of the invention.

A typical communication between specifier and supplier is provided for purposes of further describing, by way of example, the various advantages of the invention adapted for use in the business-to-business environment. A preferred implementation of the invention is, in this context, a data delivery service that provides online deliveries for clients (in this case, specifiers) with registered accounts on a pay-as-you-use basis (analogous to traditional mail or courier delivery). A specifier desires a quote on the price and delivery of potential manufacturing suppliers for the manufacture of a component part, and wishes to communicate this quote without risking unauthorized interception of the delivered data by a third party, or unwanted disclosure of sensitive or confidential business information which is not pertinent to the RFQ. The delivery is by electronic means with the requirement that the specifier communicate sophisticated information which, in this case. Is contained in a CAD/CAM file, in a secured, reliable and readable way to the supplier.

Industries today have a goal of shifting to a paperless environment. A typical specifier will therefore prefer to communicate his needs by simply delivering the CAD/CAM file to a supplier, especially where the component of manufacture cannot be easily described by a collection of two-dimensional views. Moreover, a specifier is often time not aware of the specific view, contour, and/or dimensions required by the supplier before a quote can be accurately bid for the contract. Thus, the specifier wishes to communicate his needs through a CAD/CAM environment and would furthermore prefer to deliver the file to a potentially unlimited network of suppliers in a secure, quote specific, expedited basis, especially for time sensitive contracts. By accessing the server-based data delivery system described above, the specifier can deliver an RFQ to a potentially unlimited network of suppliers through his/her account with an online delivery service, which is an embodiment of the invention.

The data delivery service of the preferred embodiment proceeds as follows. The specifier engages in a secure 2-way session with web server 32 to ensure that the delivery of the confidential and sometimes highly sensitive information contained in the CAD/CAM source file is not intercepted when the source file is uploaded over the network. The specifier needs to be authorized by web server 32 to engage in a secure 2-way session before the specifier is allowed to upload a source file to web server 32. An RFQ/instruction set, for example, a quote is needed for 50 units of part X by date Y, as described in the attached CAD file; demographics, including email address, of the specifier; and demographics, including email address, of a list of potential recipients, collectively known as the conversion order, may be uploaded with the source file. The source file and conversion order are submitted by http/https protocol to web server 32 for processing. A relay is initiated to allow conversion host 34 to access the source file via network transfer or, perhaps, directly, if conversion host 34 and web server 32 are, in fact, the same device. Database updates occur as needed to allow tracking of the current source file in process, location of the related conversion order and output file(s), etc. Conversion host 34 converts the source file and stores all output files in data storage and constructs communication messages for the recipient(s) including information from the conversion order and an invitation to download the associated output files. The supplier then accepts the invitation, engages in a secure 2-way session with web server 32, is authorized by web server 32, and accepts download of the output file(s). Web server 32 then proceeds to notify the specifier that the supplier has accepted delivery of the file (s) (the specifier may then assume that the supplier will provide a quote). The supplier is given the choice of selecting a download of the output file by itself or the output file wrapped in a self extracting file with the executable file. The supplier may also request download of the source file (as discussed earlier).

As stated earlier, the supplier need only have a personal computer with a standard operating system in order to use the data. Furthermore, as should be readily apparent to one skilled in the art, there are no software requirements or purchases at either end of the transaction. Neither the specifier nor the supplier are required to maintain, access, or update software in order use the data delivery service. The supplier may simply discard the data package after delivery, thereby eliminating any problems with maintaining software on a local intranet or requiring a particular configuration of the supplier's workstation software. Thus, the present invention offers a seamless communication means to virtually any supplier in the world with a personal computer and Internet access.

The CAD/CAM data delivered to the supplier in the above delivery system is exemplary of yet another aspect of the invention, which is a data structure that communicates sophisticated information originating in a source file over a wide area network (e.g., Internet), securely and efficiently. CAD/CAM data is one example of sophisticated data businesses wish to communicate in electronic form, but that frequently imposes software incompatibility problems between sender and recipient. Moreover, since the sophisticated information is sometimes sensitive and confidential, the specifier will often times be wary of distributing such data over a wide area network unless adequate security measures are in place both during the transmission of the data across the network, as well as in the disclosure of the information to the recipient.

One feature of the data structure is its ability to communicate sophisticated information to any recipient with a personal computer, examples of which are provided above in the CAD/CAM example. In the CAD/CAM environment, the data is not presented as a stream of text, a viewable table of numerical data, or a collection of pixels stored in a raster type image. Rather a CAD/CAM file conveys records of information describing physical attributes and spatial locations interrelated by mathematical algorithms (e.g., nested coordinate system transforms) to enable a viewer of the data to, for example, rotate the image in three dimensional space and/or extract particular information concerning a specific physical feature. Thus, the CAD/CAM file requires a high level of user interaction with the data (particularly in the specifier/supplier example since a supplier will require detailed information on a part).

Examples of sophisticated data types which may encompass the file formats of CAD/CAM applications are the category of Three Dimensional (3D) and Two Dimensional (2D) Formats. These data types include, in descending order of informational completeness, the following: 3D Solid Models, 3D Surface Models, 3D Wireframe Models, 2D Vector "Drawings" and 2D Raster Images. 3D Models can be in either vector and/or tessellated or triangulated representations of the data. Examples of 3D formats include Stereolithography and VRML which are tessellated industry standard formats, Initial Graphics Exchange Specification (IGES) which is an industry/government standard (NBS) vector format and Autodesk™ Drawing Interchange, Catia™, Pro/Engineer™ and others that are vendor proprietary 3D Vector Formats. Examples of 2D Vector Formats include Autodesk™ Drawing Interchange, Autocad™ Drawing File, Computer Graphics Metafile and HP Graphics Language.

In addition to the above data types, 2D Text and Raster files may be considered within the scope of the invention when they are delivered as a product of the uploaded source file containing sophisticated information or delivered (or bundled) with the converted source file. These variety of data types are considered to be ancillary or complimentary data to the above mentioned sophisticated 3D and 2D and include, for example, a digital photograph of parts similar to those new parts being designed and saved in one of the sophisticated data formats or digital photographs saved as JPEG's, bitmaps, etc., of parts that were designed but have since failed or have been superseded by competitive designs and need redesign. Additionally, the results of a Computer Aided Engineering (CAE) analysis, such as Finite Element Model (FEM) analysis, Computational Fluid Dynamics, Heat Transfer, or Stress/Stain may be provided as an image/raster file. Text files that accompany the above mentioned file types may also considered to be sophisticated data when they are highly related to the above mentioned source file formats, saved as image files and bundled with the output file to create a uniquely informationally rich and complete output file. These data types include, for example, sophisticated 2D raster and text files that are considered within the scope of the invention. These files may also include JPEG, Windows™ Bitmap, Compuserve™, Aldus and Macintosh™. PICT file types. Additionally, the 2D Raster Images can be redlined, marked-up or in other words, annotated and returned to the sender with this value added content included.

A second feature of the data structure is its ability to protect sensitive information contained in the source file uploaded to the network server. A preferred embodiment of this aspect of the invention provides security both for communications between sender and recipient and during delivery over the network. Examples of data deliverables providing security between sender and recipient have been noted earlier. During the conversion process, the conversion software may convert the source file into a non-modifiable file format. The conversion software may also be configured to extract only those portions of the source file that the sender wishes to communicate to the recipient or include with the output file deliverable a password access to the more sensitive information contained within the file. By delivering a non-modifiable output file and/or an output file that contains or allows access to only that information pertinent to the communication (e.g., a RFQ), a sender may limit access to, or prevent alteration of sensitive or confidential information contained in an uploaded source file.

Examples of providing security for delivery over a network (e.g., the Internet) include using an encryption protocol before providing the output file for delivery to the recipient. In a preferred embodiment, the output file is encrypted to ensure that the data cannot be accessed if intercepted over the network. One example of an encryption standard is provided above.

Another aspect of the data structure is the reduction in source file size. A reduction in file size is desirable when there is a need for avoiding network firewalls, expediting network delivery and reducing errors during transmission over the network. Moreover, in the case of transferring large amounts of data (such as CAD/CAM data), it is noted that such data cannot always be successfully communicated through an email because some email utilities place limits on file sizes. Hence, the invention provides a data structure for delivery over a network of data which cannot otherwise be transferred as an attachment to email.

The various advantages in the invention can be realized in a variety of network-based contexts, including business to business communications over the Internet. For example, the invention finds ready use in the field of Mechanical Design & Manufacturing. An example of this use is provided in the CAD/CAM delivery between designer and supplier described above. The invention is also contemplated for use in the Architecture, Building and Services Trades. In this context, detailed and sophisticated plans, specifications, and proposals can be communicated between prime and sub contractors, contractors and a government RFP solicitor, and responses to government requirements for providing company information pursuant to regulatory auditing. In some of these examples, it is contemplated that the invention finds use in providing a two-way delivery of information. For example, an RFP containing detailed requirements for a support services contract can be both distributed out to bidding contractors and responded to through the delivery of sophisticated information (with all of the necessary security measures taken for delivery over the network, which is required for this form of business communication). In this example, the server is adapted for distribution out to a plurality of recipients utilizing different computers/software, as well as for receiving data from the same plurality of recipients back to the sender. In the CAD/CAM example, this type of two-way communication may correspond to a supplier annotating the data package to indicate where more information is needed or to suggest a design change to reduce manufacturing costs (e.g., a redlining tool packaged with the downloaded software) and then sending the annotated CAD/CAM data back to the specifier.

The invention also finds utility in the context of a prospective homeowner and architect where the architect will frequently need to provide detailed plans and specifications to the homeowner for review or changes but cannot easily deliver this data to the prospective homeowner because of software incompatibilities. Yet another example of where the invention finds utility is in the medical field. Today, there is an increasing desire to communicate detailed files (e.g., MRI, NMR, Cat Scan and X-Ray data) for purposes of medical diagnosis, opinions or for patient to doctor communications. By providing a delivery system embodying the aspects of invention, doctor-to-doctor or doctor-to-patient information can be transmitted reliably and securely over a network.

Other uses of the data structure and delivery system of the present invention will be known to those skilled in the art in view of the foregoing description and are therefore considered within the scope of the invention.

What is claimed is:

1. A method for providing a solicitor with a network-based service for securely communicating a solicitation to a first and second recipient, the solicitor and recipients being connected to a server over a network, the solicitation including information generated by a software application and stored in a source file on the solicitor computer wherein a software application is needed to communicate the information in the source file in a user intelligible format for the recipients, said method comprising the steps of:

(i) receiving the source file at the server, the source file including unintelligible data comprising vector-based numerical data used to generate screen images of physical data according to user-defined input;

(ii) processing the source file for delivery to the recipients, including the steps of creating a first and second file from the data contained in the source file, wherein the first and second file type is defined by the solicitor;

(iii) providing access to the first and second files by only the first and second recipients, respectively; and (iv) providing means, provided with the first and second files, for generating screen images of physical data from the first and second files including software that allows the first and second recipient to define screen images using both a computer that has software that is capable of interrogating vector-based numerical data and a computer that is devoid of software that is capable of interrogating vector-based numerical data.

2. The method of claim 1, wherein the receiving step includes receiving a CAD file.

3. The method of claim 1, wherein processing step includes providing information that enables the first recipient to view a first graphical image based on the information contained in the source file and providing information that enables the second recipient to view a second graphical image based on the information contained in the source file.

* * * * *